US012050413B2

(12) United States Patent
Shimizu et al.

(10) Patent No.: US 12,050,413 B2
(45) Date of Patent: Jul. 30, 2024

(54) IMAGE FORMING APPARATUS

(71) Applicant: CANON KABUSHIKI KAISHA, Tokyo (JP)

(72) Inventors: Yusuke Shimizu, Kanagawa (JP); Tomoo Akizuki, Kanagawa (JP); Naoki Fukushima, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/193,529

(22) Filed: Mar. 30, 2023

(65) Prior Publication Data

US 2023/0236524 A1 Jul. 27, 2023

Related U.S. Application Data

(63) Continuation of application No. 17/722,973, filed on Apr. 18, 2022, now Pat. No. 11,640,123.

(30) Foreign Application Priority Data

Apr. 27, 2021 (JP) ................................ 2021-075139

(51) Int. Cl.
*G03G 15/08* (2006.01)
*G03G 15/06* (2006.01)

(52) U.S. Cl.
CPC .................................. *G03G 15/065* (2013.01)

(58) Field of Classification Search
CPC ... G03G 15/50; G03G 15/065; G03G 21/0005
See application file for complete search history.

(56) References Cited

U.S. PATENT DOCUMENTS

2017/0075290 A1* 3/2017 Hiramatsu ......... G03G 21/0005
2018/0292773 A1* 10/2018 Kihara .................. G03G 15/50

* cited by examiner

*Primary Examiner* — Hoan H Tran
(74) *Attorney, Agent, or Firm* — Canon U.S.A., Inc. IP Division

(57) ABSTRACT

An image forming apparatus includes a developer bearing member, a supply member, first and second voltage application units, and a control unit. Assuming that a difference between a voltage to be applied to the developer bearing member by the first voltage application unit and a voltage to be applied to the supply member by the second voltage application unit in the image forming operation is defined as a first supply contrast, and a difference between the voltage to be applied to the developer bearing member by the first voltage application unit and the voltage to be applied to the supply member by the second voltage application unit in the preliminary rotation operation is defined as a second supply contrast, the control unit controls the second supply contrast to be less than the first supply contrast or to have polarity reversed from polarity of the first supply contrast.

21 Claims, 5 Drawing Sheets

SEQUENCE CHART ACCORDING TO FIRST EXEMPLARY EMBODIMENT

SEQUENCE CHART ACCORDING TO FIRST COMPARATIVE EXAMPLE

SEQUENCE CHART ACCORDING TO SECOND EXEMPLARY EMBODIMENT

IMAGE FORMING APPARATUS

CROSS REFERENCE TO RELATED APPLICATIONS

The present application is a continuation of U.S. patent application Ser. No. 17/722,973, filed on Apr. 18, 2022, which claims priority from Japanese Patent Application No. 2021-075139, filed Apr. 27, 2021, all of which are hereby incorporated by reference herein in their entireties.

BACKGROUND

Field

The present disclosure relates to an image forming apparatus. In particular, the present disclosure relates to an electrophotographic image forming apparatus using an electrophotographic recording system.

Description of the Related Art

As a conventional image forming apparatus such as an electrophotographic printer, there is widely known an image forming apparatus using a "contact development system" in which development is performed while a photosensitive drum and a development roller are in contact with each other.

In the image forming apparatus using the "contact development system", a "preliminary rotation operation" is performed before start of an "image forming operation" or a "subsequent rotation operation" is performed after end of the "image forming operation". In the "preliminary rotation operation" or the "subsequent rotation operation", rotary members such as the development roller and the photosensitive drum are controlled to rotate.

More specifically, the "preliminary rotation operation" is performed during a period after the rotary members start a rotation operation until the "image forming operation" starts. In contrast, the "subsequent rotation operation" is performed during a period after the "image forming operation" ends until the rotary members end (stop) the rotation operation.

There is known a configuration in which the development roller and the photosensitive drum are separated from each other during the period of the "preliminary rotation operation" or the "subsequent rotation operation". However, if a "contact and separation mechanism" in which the photosensitive drum and the development roller are brought into contact with and separated from each other is provided in the image forming apparatus, the image forming apparatus tends to be complicated and upsized.

Japanese Patent Application Laid-Open No. 2006-47745 discusses an image forming apparatus not including the "contact and separation mechanism" in order to simplify and downsize the image forming apparatus.

According to Japanese Patent Application Laid-Open No. 2006-47745, the development roller and the photosensitive drum are "constantly" in contact with each other. Thus, in a period other than the period of the image forming operation, control is performed to suppress transfer of toner from the development roller to the photosensitive drum. More specifically, according to Japanese Patent Application Laid-Open No. 2006-47745, after the image forming operation ends, the toner having "negative polarity" charges on the development roller is held on the development roller so as not to be transferred to the photosensitive drum, by setting a potential of the photosensitive drum to "0" V and applying a "positive polarity" voltage to the development roller.

However, in a case where a period (a stop period) after the end of the image forming operation and before the start of the next image forming operation is long, the charges of the toner can be attenuated with the lapse of time.

In this case, since the toner on the development roller loses the charges (the negative polarity), an "electric holding force" for holding the toner having lost the charges on the development roller does not act even if the "positive polarity" voltage is applied to the development roller, and the toner can be transferred to the photosensitive drum. Such a phenomenon in which the toner is transferred from the development roller to the photosensitive drum irrespective of the image forming operation is also referred to as "development fogging".

If the "development fogging" phenomenon occurs, extra toner is consumed. In addition, the transferred toner is further transferred from the photosensitive drum to a transfer roller in some cases. If a back side of a conveyed sheet and the transfer roller to which the toner adheres come into contact with each other, the toner is further transferred to the back side of the sheet, which can contaminate the sheet.

SUMMARY

The present disclosure is directed to providing an image forming apparatus that adopts a contact development system, does not include a contact and separation mechanism, and is capable of efficiently suppressing transfer of a developer from a developer bearing member to an image bearing member in a preliminary rotation operation.

According to an aspect of the present disclosure, an image forming apparatus includes an image bearing member configured to bear an electrostatic latent image on a surface thereof, a developer bearing member configured to be in contact with the surface of the image bearing member and to bear a developer on a surface thereof to perform an image forming operation in which the electrostatic latent image is developed into an image with the developer, a supply member configured to supply the developer to the developer bearing member, a regulation member configured to triboelectrically charge the developer borne on the surface of the developer bearing member, and to regulate a layer thickness of the developer, a first voltage application unit configured to apply a voltage to the developer bearing member, a second voltage application unit configured to apply a voltage to the supply member, and a control unit configured to control the first voltage application unit and the second voltage application unit, wherein, in a case of performing operations, the control unit successively performs a preliminary rotation operation and the image forming operation, wherein, in the preliminary rotation operation, the image bearing member and the developer bearing member are in contact with each other and are rotated, and wherein, assuming that a difference between a voltage to be applied to the developer bearing member by the first voltage application unit and a voltage to be applied to the supply member by the second voltage application unit in the image forming operation is defined as a first supply contrast, and a difference between the voltage to be applied to the developer bearing member by the first voltage application unit and the voltage to be applied to the supply member by the second voltage application unit in the preliminary rotation operation is defined as a second supply contrast, the control unit controls the second supply contrast to be less than the first supply contrast or controls the second supply contrast to have polarity reversed from polarity of the first supply contrast.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings. Materials, shapes, relative arrangements, and the like of components described in the exemplary embodiments can be changed appropriately depending on a configuration of an apparatus to which any of the exemplary embodiments is applied and various conditions, and the scope of the present disclosure is not limited to the exemplary embodiments.

<Configuration of Image Forming Apparatus>

Figure 1:
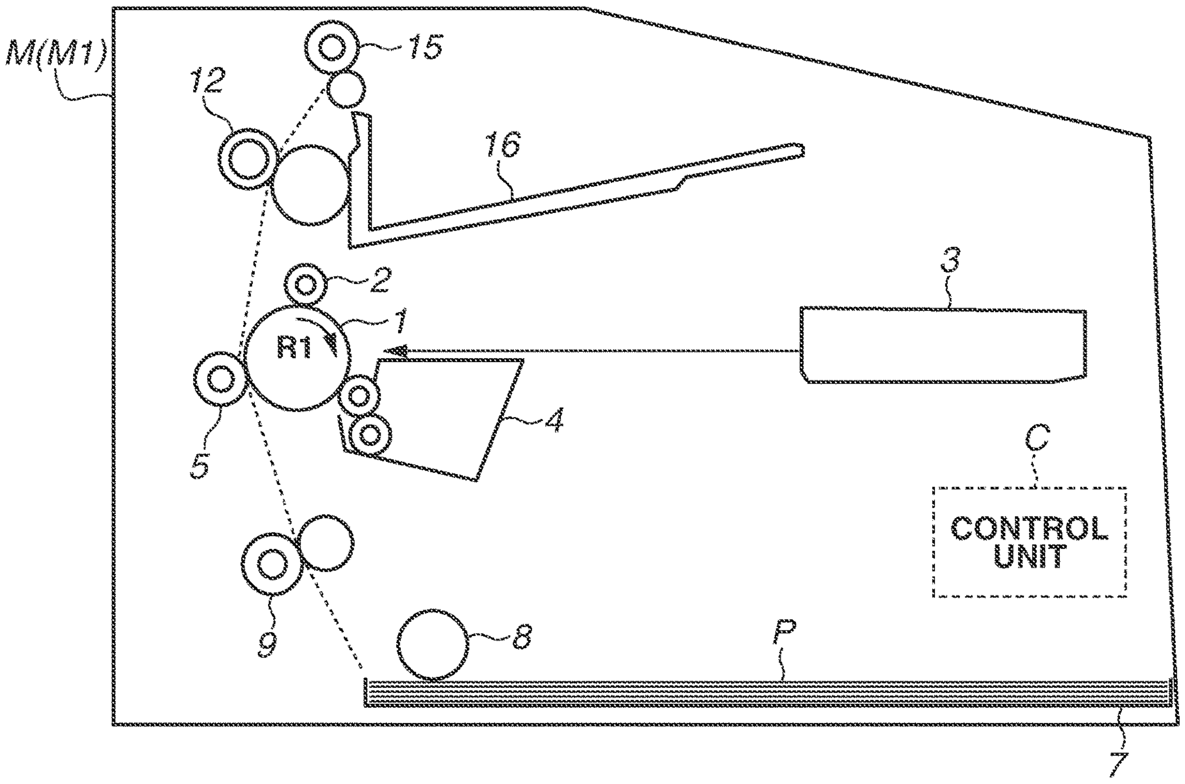
FIG. 1 is a schematic cross-sectional view of an image forming apparatus according to a first exemplary embodiment.

FIG. 1 is a schematic cross-sectional view of an image forming apparatus M according to a first exemplary embodiment of the present disclosure.

As illustrated in FIG. 1, the image forming apparatus M according to the present exemplary embodiment is an electrophotographic monochrome laser printer. A photosensitive drum (an image bearing member) 1 is rotatably supported by an apparatus main body M1, and is rotationally driven by a driving source (not illustrated) in a direction R1 at a process speed (a peripheral speed) of 150 mm/s.

A charge roller (a charge member) 2, an exposure device (an exposure unit) 3, a development device (a development unit) 4, and a transfer roller (a transfer unit) 5 are disposed around the photosensitive drum 1 in order along the rotation direction thereof. The transfer roller 5 holds a sheet P between the transfer roller 5 and the photosensitive drum 1, and transfers a toner image from the photosensitive drum 1 to the sheet P when a transfer voltage is applied to the transfer roller 5 by a transfer power supply (not illustrated).

A cassette 7 storing the sheet P is disposed at a lower part of the apparatus main body M1. A feed roller 8, a conveyance roller 9, a fixing device 12, a discharge roller 15, and a discharge tray 16 are disposed in order along a conveyance path for conveying the sheet P from the cassette 7.

A controller (a control unit) C is provided in the apparatus main body M1 of the image forming apparatus M, and controls rotation operation of each of the rollers and voltage application units (described below).

<Configuration of Development Device>

Figure 2:
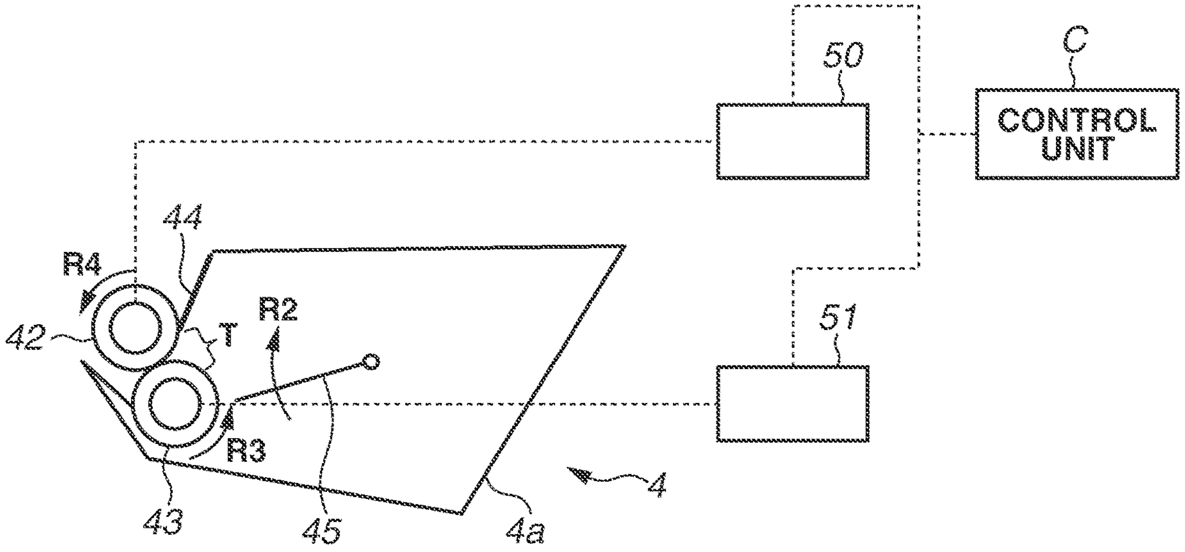
FIG. 2 is a schematic cross-sectional view of a development device of the image forming apparatus according to the first exemplary embodiment.

FIG. 2 is a schematic cross-sectional view of the development device 4 of the image forming apparatus M according to the present exemplary embodiment.

As illustrated in FIG. 2, a development roller (a developer bearing member) 42, a supply roller (a supply member) 43, and a development blade (a regulation member) 44 are provided in the development device 4. The supply roller 43 is disposed so as to come into contact with the development roller 42, and is capable of supplying toner to the development roller 42 or scrap toner from the development roller 42. In addition, a stirring bar (a stirring member) 45 for stirring toner is provided at a substantially center of a toner container 4*a*.

A developing voltage power supply (a first voltage application unit) 50 is connected to the development roller 42. A supply voltage power supply (a second voltage application unit) 51 is connected to the supply roller 43.

Operation by the development device 4 according to the present exemplary embodiment will be described next.

As illustrated in FIG. 2, in the development device 4, when the stirring bar 45 rotates in a direction R2, the toner is temporarily stored in an area T near a contact portion between the development roller 42 and the supply roller 43. The stored toner is supplied to the development roller 42 by the supply roller 43 rotating in a direction R3. Furthermore, when the development roller 42 rotates in a direction R4, the toner supplied to the development roller 42 passes the development blade (the regulation member) 44, and is made into a thin layer (coating) with a predetermined thickness.

In the present exemplary embodiment, the toner (the developer) supplied to the development roller 42 is triboelectrically charged to "negative polarity" as regular polarity by being rubbed against the development blade 44.

When the development roller 42 rotates in the direction R4, the toner (the layer) coating the development roller 42 is conveyed to a development nip portion formed by the development roller 42 and the photosensitive drum 1 facing each other.

At the development nip portion, an electric field is formed by an electrostatic latent image potential formed on the photosensitive drum 1 by the exposure device 3, and a developing voltage V3 applied to the development roller 42 by the developing voltage power supply 50. In addition, a part of the toner coating the development roller 42 is transferred to an electrostatic latent image area of the photosensitive drum 1 by the electric field. As a result, an "electrostatic latent image" is developed (visualized) as a "toner image" (a "developer image").

At the development nip portion, the toner that is not used in the development and remains on the development roller 42 is scraped by the supply roller 43 rotating at the contact portion between the development roller 42 and the supply roller 43. At the same time, the toner stored in the area T is newly supplied onto the development roller 42.

In the present exemplary embodiment, the toner remaining on the surface of the photosensitive drum 1 after the toner image is transferred from the photosensitive drum 1 is transferred from the photosensitive drum 1 to the development roller 42 by the electric field formed by the photosensitive drum 1 (the surface potential V2) and the developing voltage V3 applied to the development roller 42. In other words, the toner remaining on the surface of the photosensitive drum 1 is transferred to the development roller 42, and is finally scraped and collected by the supply roller 43. Thus, in the present exemplary embodiment, it is unnecessary to provide a dedicated cleaning unit for cleaning the surface of the photosensitive drum 1.

<Voltage Output Setting>

Output settings of voltages (V1 to V4) in an "image forming operation S2" during image formation, in a "subsequent rotation operation S3" after end of the image formation, and in a "preliminary rotation operation S1" before start of the image formation according to the present exemplary embodiment will be described next.

Figure 3:
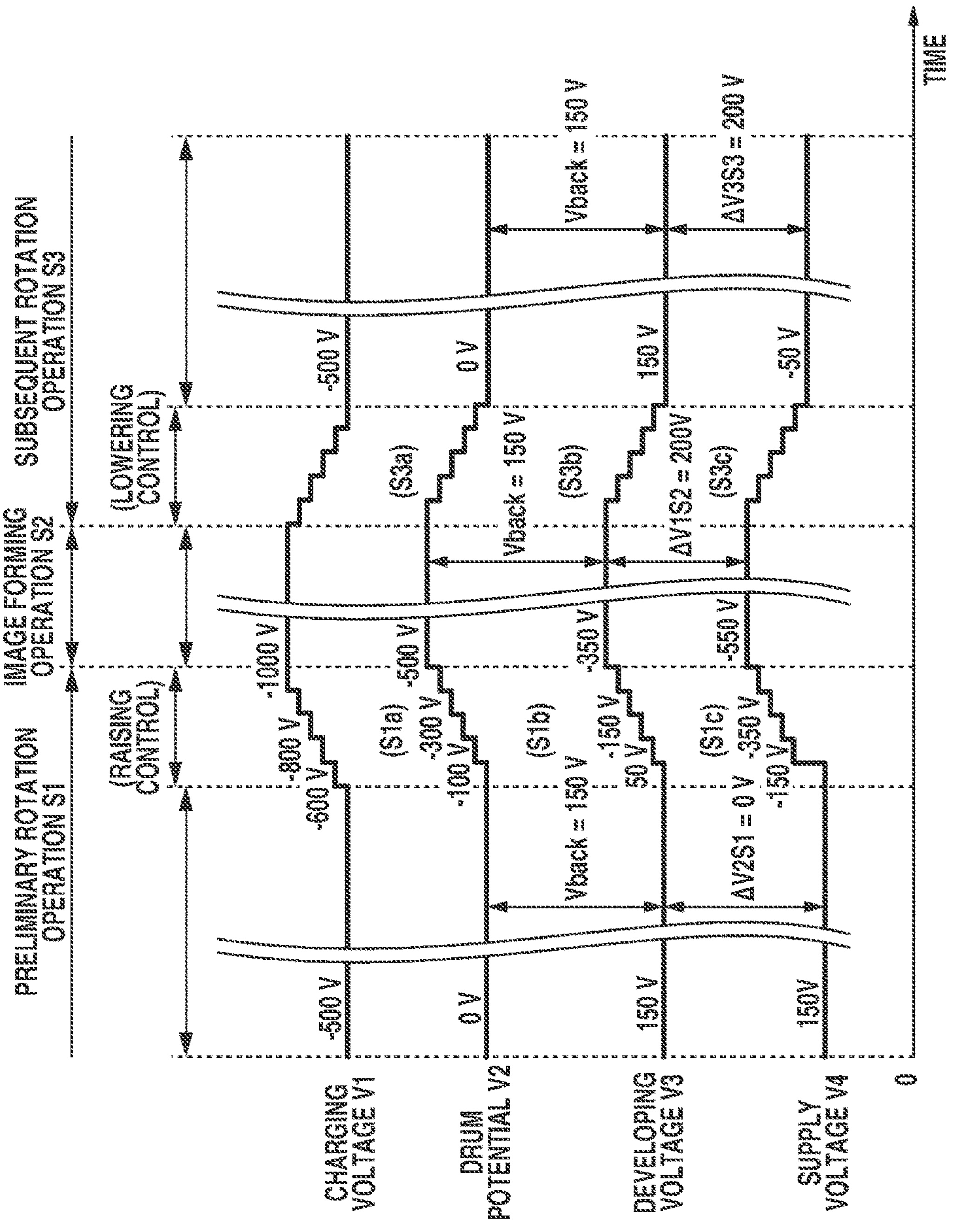
FIG. 3 is a sequence chart from a "preliminary rotation operation" to a "subsequent rotation operation" performed by the image forming apparatus according to the first exemplary embodiment.

FIG. 3 is a sequence chart from the "preliminary rotation operation S1" to the "subsequent rotation operation S3" performed by the image forming apparatus M according to the present exemplary embodiment.

The "preliminary rotation operation S1" refers to a rotation operation in which the photosensitive drum 1, the development roller 42, and the like are rotated in a period after receipt of image formation to be printed and before start of the "image forming operation S2" (i.e., before completion of transition to potential for the image formation).

On the other hand, the "subsequent rotation operation S3" refers to a rotation operation in which the photosensitive drum 1, the development roller 42, and the like are rotated without being stopped for a while after end of the "image forming operation S2" (i.e., after start of transition from the potential for the image formation).

(1) "Image Forming Operation S2" During Image Formation

The voltage output settings in the "image forming operation S2" will be described first.

In the present exemplary embodiment, as illustrated in FIG. 3, in the image forming operation S2, the drum potential V2 of the photosensitive drum 1 (the surface potential V2 after the charging by the charge roller 2) is set to "−500" V, which is a potential suitable for the image formation. More specifically, the charging voltage V1 of "−1000" V is applied to the charge roller 2 by a charge power supply (not illustrated), so that the surface of the photosensitive drum 1 is charged (to the drum potential V2).

On the other hand, the developing voltage V3 of "−350" V is applied to the development roller 42 by the developing voltage power supply 50. Accordingly, a potential difference Vback (V3−V2), which is a difference between the developing voltage V3 and the drum potential V2 (−500 V) of the photosensitive drum 1, is "150" V.

If the potential difference Vback is excessively small, there is a possibility that the toner having the charges of the regular polarity (e.g., negative polarity) may be transferred to the photosensitive drum 1 even in a non-image formation period.

In contrast, if the potential difference Vback is excessively large, there is a possibility that the toner having the charges of irregular polarity (e.g., positive polarity) may be transferred to a portion of the photosensitive drum 1 not related to an image during the image formation.

In the present exemplary embodiment, the developing voltage V3 in the image forming operation S2 is set to "−350" V so that the value of the potential difference Vback is appropriate.

On the other hand, the output of the supply voltage V4 to be applied to the supply roller 43 is set based on the amount of toner for coating the development roller 42.

In the present exemplary embodiment, the supply voltage V4 of "−550" V is applied. Accordingly, a supply contrast (a first supply contrast) ΔV1S2 (V3−V4), which is a voltage difference obtained by subtracting the supply voltage V4 of "−550" V from the developing voltage V3 "−350" V, is "200" V in the image forming operation S2. In the image forming operation S2, the toner is supplied from the supply roller 43 to the development roller 42 by the action of the electric force based on the first supply contrast.

As described below, typically, if the supply contrast (V3−V4) is excessively large, the amount of toner coating the development roller 42 is increased, so that a frequency of the toner being rubbed against the surface of the development blade 44 "on a per-particle basis" is reduced. As a result, the charges may not be sufficiently imparted to the toner. In this case, the electric force that holds the toner on the development roller 42 tends to be insufficient, and a possibility that the toner may be peeled from the development roller 42 is increased.

In contrast, if the supply contrast (V3-V4) is excessively small, the amount of toner to be supplied to the surface of the development roller 42 is reduced. As a result, there is a possibility that image density of the formed image may be reduced. Furthermore, in a case where the supply contrast has a "negative value" (i.e., in a case where a magnitude relationship between the developing voltage V3 and the supply voltage V4 is reversed and the "voltage difference" causes "reversed polarity"), an "electric force" in a direction in which the toner is moved from the development roller 42 to the supply roller 43 acts. Thus, the toner is scraped from the development roller 42 by the supply roller 43, and the possibility of the reduction of the image density is further increased.

As described above, adjusting the supply contrast (V3-V4) makes it possible to control the amount of toner to be supplied from the supply roller 43 to the development roller 42. Furthermore, suppressing the amount of toner to be supplied to the development roller 42 makes it possible to improve the "frequency of rubbing (charging)" the toner, and to adjust the charge amount (the polarity) of the toner.

(2) "Subsequent Rotation Operation S3" after Image Formation

The voltage output settings in the "subsequent rotation operation S3" after the end of the image forming operation S2 will be described next.

In the present exemplary embodiment, as illustrated in FIG. 3, after the end of the image forming operation S2, the charging voltage V1 is controlled so that the drum potential V2 of the photosensitive drum 1 is "0" V.

Accordingly, in the "preliminary rotation operation S1" for the next image formation, the drum potential V2 of the photosensitive drum 1 is constantly "0" V irrespective of attenuation of the drum potential V2. In other words, as long as the drum potential V2 of the photosensitive drum 1 is controlled (set) to "0" V in the subsequent rotation operation S3, the drum potential V2 can be constantly started from "0" V in the next image formation.

Thus, applying a voltage of a predetermined polarity (e.g., positive polarity) to the development roller 42 with respect to the drum potential "0" V before the start of the next image formation (i.e., in the preliminary rotation operation S1) makes it possible to electrically hold the toner of the polarity (e.g., negative polarity) reversed from the predetermined polarity, on the development roller 42. In other words, in the next image formation, it is unnecessary to consider "the degree of drum potential attenuation" based on an elapsed time from the previous image formation in control of the preliminary rotation operation S1.

In the present exemplary embodiment, the drum potential V2 immediately after the end of the "image forming operation S2" is "−500" V. Thus, in the present exemplary embodiment, control S3a of lowering (changing) the charging voltage V1 from "−1000" V to "−500" V in "100" V increments is performed so that the drum potential V2 is "0" V in the subsequent rotation operation S3.

As a result, the drum potential V2 is similarly lowered in "100" V increments, and finally becomes "0" V.

Meanwhile, in the present exemplary embodiment, in the subsequent rotation operation S3, the developing voltage V3 is synchronized with the control S3a of lowering the charging voltage V1 in order to maintain the potential difference Vback of "150" V in the image forming operation S2. More specifically, control S3b and S3c of lowering (changing) the developing voltage V3 and the supply voltage V4 in "50" V increments is performed.

When such control is performed, it is possible to electrically hold the toner on the development roller 42 without transferring the toner to the photosensitive drum 1 even in the subsequent rotation operation S3, as in the image forming operation S2.

In the present exemplary embodiment, in the subsequent rotation operation S3, the developing voltage V3 is "150" V, and the supply voltage V4 is "−50" V. Accordingly, a supply contrast (a third supply contrast) ΔV3S3 (V3−V4) in the subsequent rotation operation S3 is "200" V, which is equal to the (first) supply contrast ΔV1S2 in the image forming operation S2.

In addition, as illustrated in FIG. 3, in the present exemplary embodiment, the regular charging polarity of the developer is "negative polarity", and the control S3a (the lowering control) of changing the drum potential V2 from "−500" V to "0" V in a stepwise manner is performed in the subsequent rotation operation S3. In contrast, if the regular charging polarity of the developer is "positive polarity", control (lowering control) of changing the drum potential V2 from, for example, "500" V to "0" V in a stepwise manner may be performed in the subsequent rotation operation S3. This also applies to the developing voltage V3 and the supply voltage V4.

(3) "Preliminary Rotation Operation S1" Before Image Formation

The voltage output settings in the "preliminary rotation operation S1" before the start of the image forming operation S2 will be described next.

As described above, when the drum potential V2 is set to "0" V in the "subsequent rotation operation S3" after the image formation, the drum potential V2 is also "0" V at the start of the "preliminary rotation operation S1" for the next image formation.

In the present exemplary embodiment, as illustrated in FIG. 3, in the preliminary rotation operation S1, the developing voltage V3 of "+150" V is applied to the development roller 42. On the other hand, the drum potential V2 is "0" V. Accordingly, the potential difference Vback (V3−V2) is "150" V, which is equal to the potential difference Vback in the image forming operation S2.

As described above, in the present exemplary embodiment, in the "preliminary rotation operation S1", it is possible to suppress the transfer of the toner on the development roller 42 to the photosensitive drum 1, as in the image forming operation S2 and the subsequent rotation operation S3.

In a case where the elapsed time from the end of the previous image forming operation S2 is long, there is a possibility that the charges of the toner on the development roller 42 may be attenuated with the lapse of time.

If the charges of the toner are attenuated, the action of the "electric force" for holding the toner on the development roller 42 is weakened. Thus, when the development roller 42 and the photosensitive drum 1 are rotated while being in contact with each other, there is a possibility that the toner may be transferred from the development roller 42 onto the photosensitive drum 1.

The charges of the toner on the development roller 42 are increased in proportional to the number of times that the toner passes (is rubbed against) the development blade 44 along with the rotation of the development roller 42. However, in a case where the cumulative number of rotations of the development roller 42 is small, the charges of the toner may not be sufficient to hold the toner on the development roller 42.

In other words, as long as the development roller 42 and the photosensitive drum 1 are in contact with each other, there is a possibility that the toner on the development roller 42 may be continuously transferred to the photosensitive drum 1 until the toner has the sufficient charges.

To address this, in the present exemplary embodiment, in order to impart charges to the toner having the attenuated charges at an early stage, the voltage output settings different from those in the image forming operation S2 are performed in the preliminary rotation operation S1. This makes it possible to suppress the transfer of the toner to the photosensitive drum 1.

More specifically, in the "preliminary rotation operation S1" before the image forming operation S2, the supply voltage V4 to be applied to the supply roller 43 is set to "150" V, so that the supply contrast (the second supply contrast) ΔV2S1 (V3−V4) is adjusted to "0" V.

The "(first) supply contrast" ΔV1S2 in the image forming operation S2 is "200" V. The (second) supply contrast ΔV2S1 in the preliminary rotation operation S1 is smaller than the "(first) supply contrast" ΔV1S2 in the image forming operation S2. Accordingly, as compared with the image forming operation S2, the amount of toner to be supplied from the supply roller 43 to the development roller 42 is small, and the amount of toner coating the development roller 42 is also small.

As a result, the frequency of the toner being rubbed against the development blade 44 is increased, so that the toner can have charges at an early stage through the triboelectric charging.

As described above, in the preliminary rotation operation S1, the supply voltage V4 is adjusted to reduce the (second) supply contrast ΔV2S1, which makes it possible to suppress the amount of toner to be supplied to the development roller 42. Accordingly, the frequency of rubbing the toner on the development roller 42 against the development blade 44 "on a per-particle basis" is increased. Thus, in the preliminary rotation operation S1, the charges of the toner are increased at an early stage, so that the "development fogging (amount)" can be suppressed. In other words, in the preliminary rotation operation S1, the transfer of the toner from the development roller 42 to the photosensitive drum 1 is suppressed.

In the present exemplary embodiment, after the photosensitive drum 1 is rotated at a predetermined rotation speed in a state where the drum potential V2 is "0" V, control S1a of raising (changing) the charging voltage V1 is performed to change (switch) the drum potential V2 to that for the image forming operation S2 (i.e., "−500" V).

More specifically, as illustrated in FIG. 3, the control Sla of raising the charging voltage V1 in "100" V increments is performed immediately before the start of the image forming operation S2, and the drum potential V2 of the photosensitive drum 1 is adjusted to "−500" V before the start of the image forming operation S2.

In other words, when the charging voltage V1 is raised from "−500" V to "−1000" V in a stepwise manner, the drum potential V2 is similarly raised in "100" V increments, and finally becomes "−500" V.

Furthermore, in the preliminary rotation operation S1, the developing voltage V3 is synchronized with the control S1a of raising the charging voltage V1 so that the potential difference Vback in the image forming operation S2 is maintained at "150" V, as in the "subsequent rotation operation S3". More specifically, control S1b and S1c of raising (changing) the developing voltage V3 and the supply voltage V4 in "50" V increments is performed.

As illustrated in FIG. 3, in the present exemplary embodiment, the regular charging polarity of the developer is "negative polarity", and the control S1a (raising control) of changing the drum potential V2 from "0" V to "−500" V in a stepwise manner is performed in the preliminary rotation operation S1. In contrast, in a case where the regular charging polarity of the developer is "positive polarity", control (raising control) of changing the drum potential V2 from "0" V to, for example, "500" V in a stepwise manner may be performed in the preliminary rotation operation S1. This also applies to the developing voltage V3 and the supply voltage V4.

First Comparative Example

Next, an effect of the present exemplary embodiment will be described based on a comparison with a first comparative example.

To verify the effect of the present exemplary embodiment, the amount of "development fogging" (the development fogging amount) in the "preliminary rotation operation S1" according to the present exemplary embodiment has been measured.

As a comparison with the present exemplary embodiment, similar measurement has been performed in the first comparative example.

Figure 4:
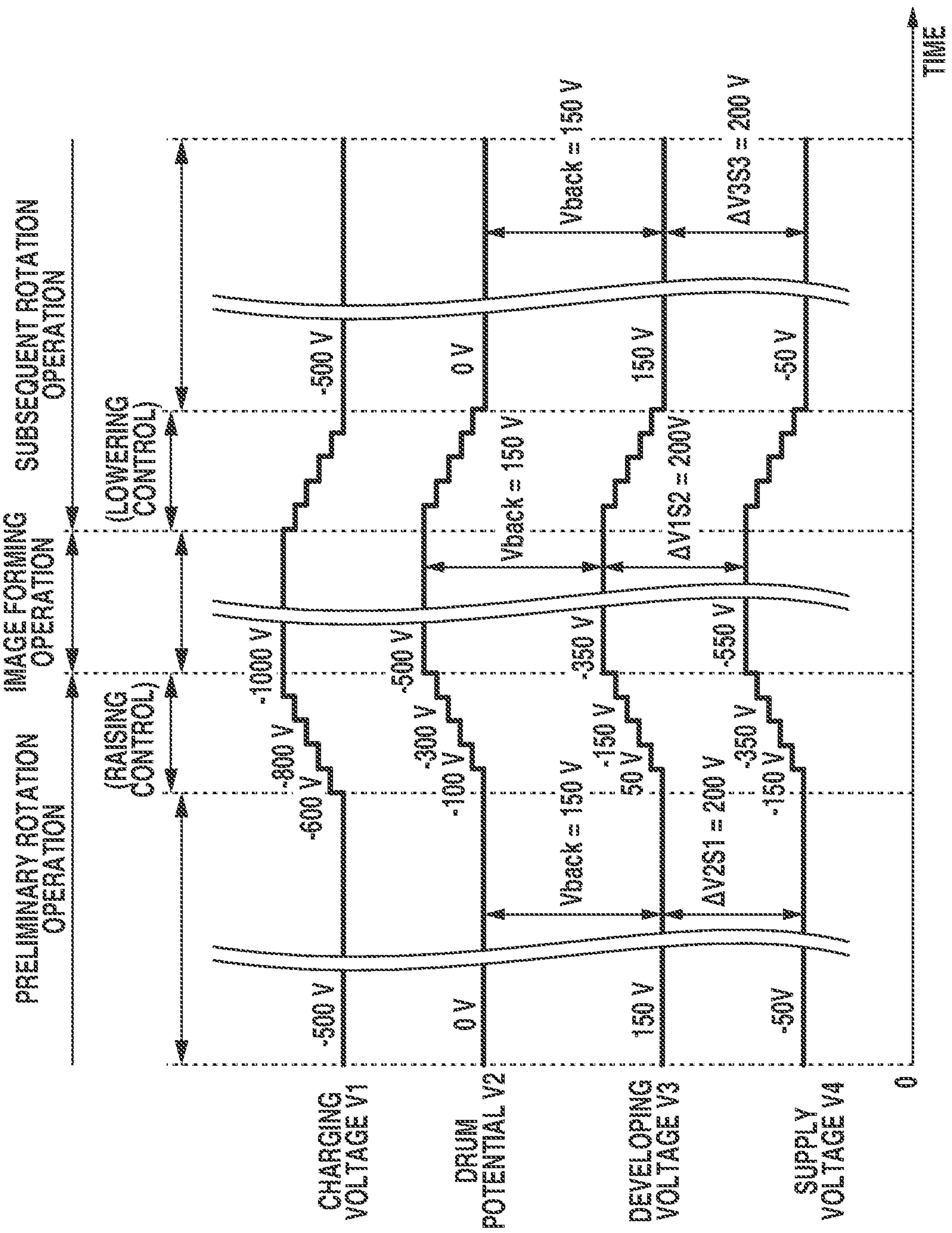
FIG. 4 is a sequence chart from the "preliminary rotation operation" to the "subsequent rotation operation" according to a first comparative example.

FIG. 4 is a sequence chart from the "preliminary rotation operation S1" to the "subsequent rotation operation S3" according to the present comparative example.

Table 1 illustrates the voltage output settings in the preliminary rotation operation S1 according to the present exemplary embodiment and those according to the present comparative example.

TABLE 1

| | First Exemplary Embodiment | First Comparative Example |
|---|---|---|
| Drum Potential V2 | 0 | 0 |
| Developing Voltage V3 | 150 | 150 |
| Supply Voltage V4 | 150 | −50 |
| Vback | 150 | 150 |
| (Second) Supply Contrast ΔV2S1 | 0 | 200 |

As understood from Table 1 or FIG. 4, in the present comparative example, the value of the (second) supply contrast ΔV2S1 in the preliminary rotation operation S1 is set to be different from that in the present exemplary embodiment.

More specifically, as illustrated in Table 1 or FIG. 4, in the present comparative example, the supply voltage V4 is set to "−50" V so that the (second) supply contrast ΔV2S1 is "200" V in the preliminary rotation operation S1. In contrast, in the present exemplary embodiment (see Table 1 or FIG. 3), the supply voltage V4 and the developing voltage V3 are both set to "150" V so that the (second) supply contrast ΔV2S1 is "0" in the preliminary rotation operation S1.

The comparative experiment according to the present comparative example and the present exemplary embodiment has been performed under a "high-temperature high-humidity" environment, which is an environment where the charges of the toner can be easily attenuated. More specifically, the comparative experiment has been performed under an environment with a temperature of 30° C. and a relative humidity of 80%.

An interval of the image formation has been adjusted so that the elapsed time from the end of the previous image formation is "three hours". To quantify (measure) the "development fogging amount", a "tape" has been affixed to the surface of the photosensitive drum 1 on which the development fogging occurs, and the density of the toner adhering to the affixed tape (the amount of toner adhering to unit area of adhesive surface of the tape) has been measured using a densitometer.

As the densitometer for the comparative experiment, DENSITOMETER TC-6DS/A (from Tokyo Denshoku Co., Ltd.) has been used. The measurement target (the tape affixation target) is a surface of the photosensitive drum 1 facing a peripheral surface of the development roller 42 in each of a first round, a fifth round, and a tenth round of the development roller 42 with the start of the preliminary rotation operation S1 as a starting point.

Table 2 illustrates measurement (comparison) results of the development fog density (%) between the present exemplary embodiment and the present comparative example.

TABLE 2

| | First Round of Development Roller | Fifth Round of Development Roller | Tenth Round of Development Roller |
|---|---|---|---|
| First Exemplary Embodiment | 20% | 10% | 5% |
| First Comparative Example | 19% | 18% | 15% |

As illustrated in Table 2, in the first round of the development roller 42, there is no significant difference in the development fog density between the present exemplary embodiment and the present comparative example. However, in the fifth round and the tenth round, it is verified that the "development fog density" is significantly lowered in the present exemplary embodiment as compared with the present comparative example.

The (second) supply contrast ΔV2S1 in the present comparative example is "200" V, whereas the (second) supply contrast ΔV2S1 in the present exemplary embodiment is small ("0" V). Thus, as compared with the present comparative example, in the present exemplary embodiment, the amount of toner to be supplied from the supply roller 43 to the development roller 42 is small, and this increases the frequency of the toner being rubbed against the surface of the development blade 44 "on a per-particle basis" when the toner passes the development blade 44. Accordingly, it is presumed that the charges of the toner are increased at an early stage in the present exemplary embodiment.

As described above, adjusting the voltage output settings makes it possible to suppress the transfer of the toner to the photosensitive drum 1 (i.e., the "development fogging" phenomenon) in the "preliminary rotation operation S1"

before the start of the image forming operation S2 even in the configuration in which the development roller 42 and the photosensitive drum 1 are constantly in contact with each other.

Next, a second exemplary embodiment of the present disclosure will be described with reference to FIG. 5. A configuration of an image forming apparatus M according to the present exemplary embodiment is basically similar to the configuration of the image forming apparatus M according to the first exemplary embodiment. In the following, a main difference from the first exemplary embodiment will be described.

Figure 5:
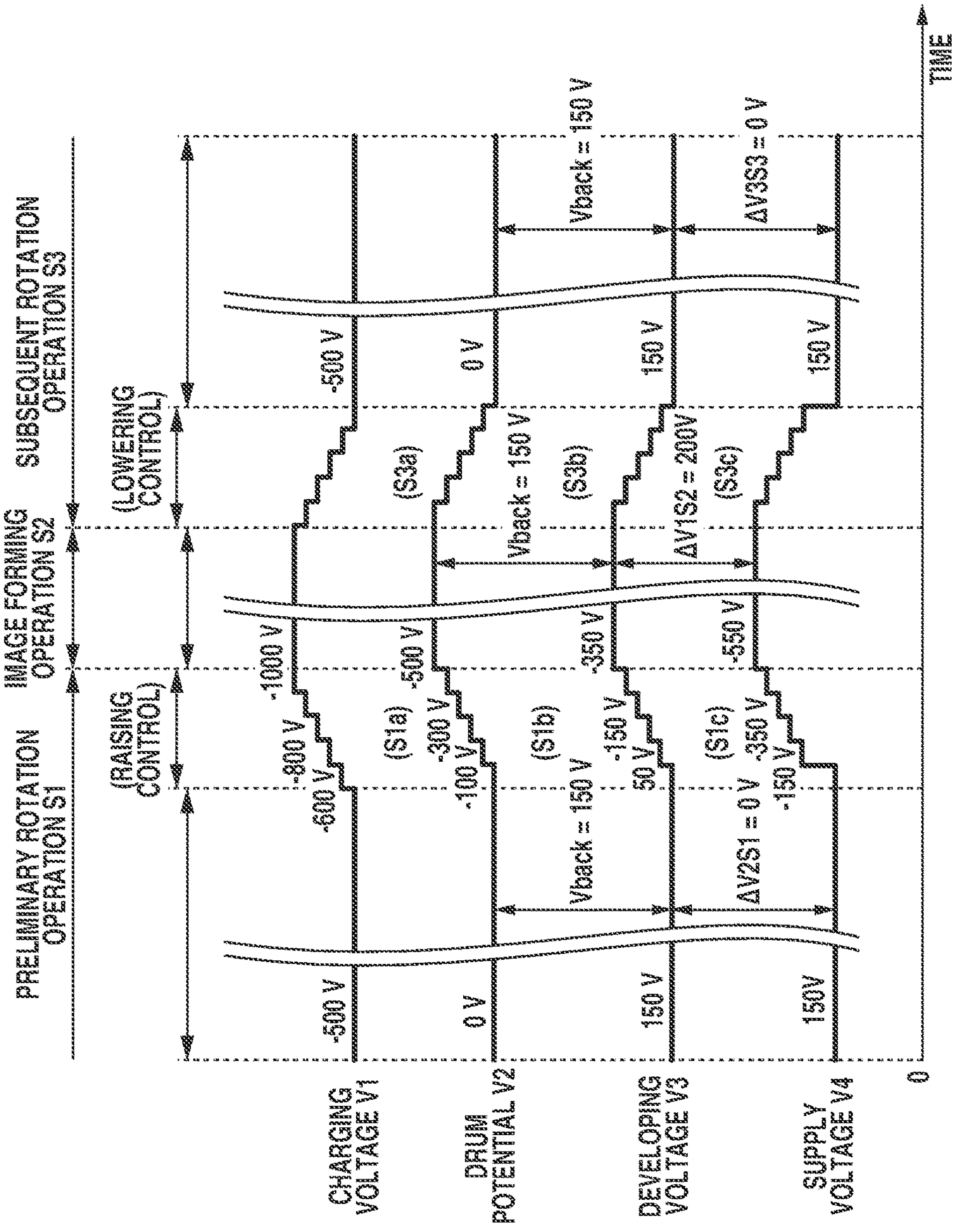
FIG. 5 is a sequence chart from the "preliminary rotation operation" to the "subsequent rotation operation" performed by an image forming apparatus according to a second exemplary embodiment.

FIG. 5 is a sequence chart from the "preliminary rotation operation S1" to the "subsequent rotation operation S3" performed by the image forming apparatus M according to the present exemplary embodiment.

The present exemplary embodiment is different from the first exemplary embodiment in the voltage output settings in the "subsequent rotation operation S3" after the end of the image forming operation S2.

In contrast, the voltage output settings in the "preliminary rotation operation S1" before the start of the image forming operation S2 are the same as those according to the first exemplary embodiment.

Table 3 illustrates the voltage output settings in the "subsequent rotation operation S3" according to the present exemplary embodiment. For reference, the voltage output settings in the "subsequent rotation operation S3" according to the first exemplary embodiment are also illustrated in Table 3.

TABLE 3

| | First Exemplary Embodiment | Second Exemplary Embodiment |
|---|---|---|
| Drum Potential V2 | 0 | 0 |
| Developing Voltage V3 | 150 | 150 |
| Supply Voltage V4 | −50 | 150 |
| Vback | 150 | 150 |
| (Third) Supply Contrast ΔV3S3 | 200 | 0 |

As illustrated in Table 3, in the subsequent rotation operation S3 according to the first exemplary embodiment, the supply voltage V4 is "−50" V, and the (third) supply contrast ΔV3S3 is "200" V as in the image forming operation S2. In contrast, in the subsequent rotation operation S3 according to the present exemplary embodiment, the supply voltage V4 is "150" V, and the (third) supply contrast ΔV3S3 is "0" V.

In other words, the configuration according to the present exemplary embodiment is different from the configuration according to the first exemplary embodiment in that the (third) supply contrast ΔV3S3 in the subsequent rotation operation S3 is made smaller than the supply contrast in the image forming operation S2.

Table 4 illustrates a measurement (comparison) result of the development fog density (%) according to the present exemplary embodiment. For reference, the measurement result according to the first exemplary embodiment is also illustrated in Table 4.

TABLE 4

| | First Round of Development Roller | Fifth Round of Development Roller | Tenth Round of Development Roller |
|---|---|---|---|
| First Exemplary Embodiment | 19% | 10% | 5% |
| Second Exemplary Embodiment | 9% | 5% | 3% |

As illustrated in Table 4, it is verified that, in the present exemplary embodiment, the development fogging is significantly suppressed in and after the first round of the development roller 42, as compared with the first exemplary embodiment.

It is presumed that the (third) supply contrast ΔV3S3 in the "subsequent rotation operation S3" after the image forming operation S2 is made smaller to reduce the toner coating amount on the development roller 42 and this makes it possible to reduce the toner coating amount on the development roller 42 in the "preliminary rotation operation S1" for the next image forming operation S2.

In addition, reducing the toner coating amount on the development roller 42 in the preliminary rotation operation S1 makes it possible to achieve an effect of reducing the amount of toner coming into contact with the photosensitive drum 1 and an effect of increasing the frequency of the toner coming into contact with the development blade 44 on a per-particle basis at the same time. Therefore, it is presumed that, in the present exemplary embodiment, the development fogging is significantly suppressed in and after the first round of the development roller 42 by these effects.

As described above, adjusting the voltage output settings makes it possible to efficiently suppress the transfer of the toner to the photosensitive drum 1 (i.e., the "development fogging" phenomenon) in the "preliminary rotation operation S1" before the start of the image forming operation S2 even in the configuration in which the development roller 42 and the photosensitive drum 1 are constantly in contact with each other. In particular, as described above, in the present exemplary embodiment, it is possible to further suppress the transfer of the toner to the photosensitive drum 1 as compared with the first exemplary embodiment.

The exemplary embodiments of the present disclosure can be summarized as follows:

(1) The image forming apparatus M according to an exemplary embodiment of the present disclosure includes the image bearing member 1 configured to bear an electrostatic latent image on the surface thereof, the developer bearing member 42 configured to be in contact with the surface of the image bearing member 1 and to bear a developer on a surface thereof to perform the image forming operation S2 in which the electrostatic latent image is developed into an image with the developer, the developer bearing member 42 is in contact with the surface of the image bearing member 1, the supply member 43 configured to supply the developer to the developer bearing member 42, the regulation member 44 configured to triboelectrically charge the developer borne on the surface of the developer bearing member 42, and to regulate a layer thickness of the developer, the first voltage application unit 50 configured to apply the developing voltage V3 to the developer bearing member 42, the second voltage application unit 51 configured to apply the supply voltage V4 to the supply member 43, and the control unit C configured to control the first voltage application unit 50 and the second voltage application unit 51.

The control unit C successively performs the preliminary rotation operation S1 and the image forming operation S2, wherein, in the preliminary rotation operation S1, the image bearing member 1 and the developer bearing member 42 are in contact with each other and are rotated.

Assuming that the difference (V3−V4) between the developing voltage V3 to be applied to the developer bearing member 42 by the first voltage application unit 50 and the supply voltage V4 to be applied to the supply member 43 by the second voltage application unit 51 in the image forming operation (S2) is defined as the first supply contrast ΔV1S2, and the difference (V3−V4) between the developing voltage V3 to be applied to the developer bearing member 42 by the first voltage application unit 50 and the supply voltage V4 to be applied to the supply member 43 by the second voltage application unit 51 in the preliminary rotation operation S1 is defined as the second supply contrast ΔV2S1, the control unit C controls the second supply contrast ΔV2S1 to be less than the first supply contrast ΔV1S2 or to have the polarity reversed from the polarity of the first supply contrast ΔV1S2.

This makes it easier to properly maintain the charges of the developer borne on the developer bearing member 42 in the preliminary rotation operation S1, and efficiently suppresses the amount of developer to be transferred from the developer bearing member 42 to the image bearing member 1.

(2) In the image forming apparatus M according to the exemplary embodiment of the present disclosure, the subsequent rotation operation S3 in which the image bearing member 1 and the developer bearing member 42 are rotated while being in contact with each other may be performed following the image forming operation S2.

Assuming that the difference (V3-V4) between the developing voltage V3 to be applied to the developer bearing member 42 by the first voltage application unit 50 and the supply voltage V4 to be applied to the supply member 43 by the second voltage application unit 51 in the subsequent rotation operation S3 is defined as the third supply contrast ΔV3S3, the control unit C may control the third supply contrast ΔV3S3 to be less than the first supply contrast ΔV1S2 or to have the polarity reversed from the polarity of the first supply contrast ΔV1S2.

Accordingly, in the subsequent rotation operation S3, the amount of developer to be supplied from the supply member 43 to the developer bearing member 42 can be suppressed. As a result, in the preliminary rotation operation S1 for the next image formation, the charges of the developer borne on the developer bearing member 42 are properly maintained easily, and the amount of developer to be transferred from the developer bearing member 42 to the image bearing member 1 is efficiently suppressed.

(3) In the image forming apparatus M according to the exemplary embodiment of the present disclosure, the surface potential V2 of the image bearing member 1 can be adjusted to zero in the subsequent rotation operation S3.

(4) In the image forming apparatus M according to the exemplary embodiment of the present disclosure, the third supply contrast ΔV3S3 can be adjusted to zero in the subsequent rotation operation S3.

(5) In the image forming apparatus M according to the exemplary embodiment of the present disclosure, the surface potential V2 of the image bearing member 1 can be adjusted to zero in the preliminary rotation operation S1.

(6) In the image forming apparatus M according to the exemplary embodiment of the present disclosure, the second supply contrast ΔV2S1 can be adjusted to zero in the preliminary rotation operation S1.

(7) The image forming apparatus M according to another exemplary embodiment of the present disclosure includes the image bearing member 1 configured to bear an electrostatic latent image on the surface thereof, the developer bearing member 42, configured to be in contact with the surface of the image bearing member 1 and to bear a developer on a surface thereof to perform the image forming operation S2 in which the electrostatic latent image is developed into an image with the developer, the supply member 43 configured to supply the developer to the developer bearing member 42, the regulation member 44 configured to triboelectrically charge the developer borne on the surface of the developer bearing member 42, and to regulate a layer thickness of the developer, the first voltage application unit 50 configured to apply the developing voltage V3 to the developer bearing member 42, the second voltage application unit 51 configured to apply the supply voltage V4 to the supply member 43, and the control unit C configured to control the first voltage application unit 50 and the second voltage application unit 51.

The control unit C successively performs the image forming operation S2 and the subsequent rotation operation S3, wherein, in the subsequent rotation operation S3, the image bearing member 1 and the developer bearing member 42 are in contact with each other and are rotated.

Assuming that the difference (V3−V4) between the developing voltage V3 to be applied to the developer bearing member 42 by the first voltage application unit 50 and the supply voltage V4 to be applied to the supply member 43 by the second voltage application unit 51 in the image forming operation S2 is defined as the first supply contrast ΔV1S2 and the difference (V3−V4) between the developing voltage V3 to be applied to the developer bearing member 42 by the first voltage application unit 50 and the supply voltage V4 to be applied to the supply member 43 by the second voltage application unit 51 in the subsequent rotation operation S3 is defined as the third supply contrast ΔV3S3, the control unit C controls the third supply contrast ΔV3S3 to be less than the first supply contrast ΔV1S2 or to have the polarity reversed from the polarity of the first supply contrast ΔV1S2.

(8) In the image forming apparatus M according to the other exemplary embodiment of the present disclosure, the surface potential V2 of the image bearing member 1 can be adjusted to zero in the subsequent rotation operation S3.

(9) In the image forming apparatus M according to the other exemplary embodiment of the present disclosure, the third supply contrast ΔV3S3 can be adjusted to zero in the subsequent rotation operation S3.

(10) In the image forming apparatus M according to the other exemplary embodiment of the present disclosure, the control unit C is configured to perform the control S1a of changing the surface potential V2 of the image bearing member 1 in a stepwise manner immediately before the start of the image forming operation S2, in the preliminary rotation operation S1.

(11) In the image forming apparatus M according to the other exemplary embodiment of the present disclosure, the control unit C is configured to perform the control S1b of changing, in a stepwise manner, the developing voltage V3 to be applied to the developer bearing member 42 by the first voltage application unit 50 and the control S1c of changing, in a stepwise manner, the supply voltage V4 to be applied to the supply member 43 by the second voltage application unit 51 immediately before the start of the image forming operation S2, in the preliminary rotation operation S1.

(12) In the image forming apparatus M according to the other exemplary embodiment of the present disclosure, the control unit C is configured to perform the control S3a of changing the surface potential V2 of the image bearing member 1 in a stepwise manner immediately after the end of the image forming operation S2, in the subsequent rotation operation S3.

(13) In the image forming apparatus M according to the other exemplary embodiment of the present disclosure, the control unit C is configured to perform the control S3b of changing, in a stepwise manner, the developing voltage V3 to be applied to the developer bearing member 42 by the first voltage application unit 50 and the control S3c of changing, in a stepwise manner, the supply voltage V4 to be applied to the supply member 43 by the second voltage application unit 51 immediately after the end of the image forming operation S2, in the subsequent rotation operation S3.

(14) In the image forming apparatus M according to the other exemplary embodiment of the present disclosure, the developer remaining on the surface of the developer bearing member 42 after a developer image is transferred from the image bearing member 1 may be collected by the developer bearing member 42.

According to the exemplary embodiments of the present disclosure, in the image forming apparatus that adopts the contact development system and does not include the contact and separation mechanism, it is possible to efficiently suppress the transfer of the developer from the development bearing member to the image bearing member in the preliminary rotation operation.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:

an image bearing member configured to bear an electrostatic latent image on a surface of the image bearing member;

a developer bearing member configured to be in contact with the surface of the image bearing member and to bear a developer on a surface of the developer bearing member to perform an image forming operation in which the electrostatic latent image is developed into an image with the developer;

a supply member configured to be in contact with the surface of the developer bearing member and to supply the developer to the developer bearing member;

a voltage application unit configured to apply a voltage to the developer bearing member; and a control unit configured to control the voltage application unit, wherein, in a case of performing operations, the control unit performs a first rotation operation before performing the image forming operation, wherein, in the first rotation operation, the surface of the image bearing member and the surface of the developer bearing member are in contact with each other and are rotated, and wherein, assuming that a potential difference between the developer bearing member and the supply member in the image forming operation is defined as a first potential difference, and a potential difference between the developer bearing member and the supply member in the first rotation operation is defined as a second potential difference, the control unit controls the voltage application unit to form the second potential difference to be less than the first potential difference or controls the second potential difference to have polarity reversed from polarity of the first potential difference.

2. The image forming apparatus according to claim 1, wherein a second rotation operation in which the image bearing member and the developer bearing member are rotated while being in contact with each other is performed following the image forming operation, and wherein, assuming that a potential difference between the developer bearing member and the supply member in the second rotation operation is defined as a third potential difference, the control unit controls the voltage application unit to form the third potential difference to be less than the first potential difference or controls the third potential difference to have the polarity reversed from the polarity of the first potential difference.

3. The image forming apparatus according to claim 2, wherein a surface potential of the image bearing member is zero in the second rotation operation.

4. The image forming apparatus according to claim 2, wherein the third potential difference is zero in the second rotation operation.

5. The image forming apparatus according to claim 2, wherein, in the second rotation operation, the control unit performs control to change a surface potential of the image bearing member in a stepwise manner immediately after end of the image forming operation.

6. The image forming apparatus according to claim 5, wherein, in the second rotation operation, the control unit performs control to change, in the stepwise manner, the voltage to be applied to the developer bearing member by the voltage application unit immediately after the end of the image forming operation.

7. The image forming apparatus according to claim 1, wherein a surface potential of the image bearing member is zero in the first rotation operation.

8. The image forming apparatus according to claim 1, wherein the second potential difference is zero in the first rotation operation.

9. The image forming apparatus according to claim 1, wherein the control unit performs control to change a surface potential of the image bearing member in a stepwise manner immediately before start of the image forming operation, in the first rotation operation.

10. The image forming apparatus according to claim 9, wherein the control unit performs control to change, in the stepwise manner, the voltage to be applied to the developer bearing member by the voltage application unit, immediately before the start of the image forming operation, in the first rotation operation.

11. The image forming apparatus according to claim 1, wherein, in a case where developer remains on the surface of the image bearing member after a developer image is transferred from the image bearing member, the remaining developer is collected by the developer bearing member.

12. An image forming apparatus comprising:

an image bearing member configured to bear an electrostatic latent image on a surface of the image bearing member;

a developer bearing member configured to be in contact with the surface of the image bearing member and to bear a developer on a surface of the developer bearing member to perform an image forming operation in which the electrostatic latent image is developed into an image with the developer;

a supply member configured to be in contact with the surface of the developer bearing member and to supply the developer to the developer bearing member;

a voltage application unit configured to apply a voltage to the developer bearing member; and a control unit configured to control the voltage application unit, wherein, in a case of performing operations, the control unit performs a first rotation operation after performing the image forming operation, wherein, in the first rotation operation, the surface of the image bearing member and the surface of the developer bearing member are in contact with each other and are rotated, and wherein, assuming that a potential difference between the developer bearing member and the supply member in the image forming operation is defined as a first potential difference, and a potential difference between the developer bearing member and the supply member in the first rotation operation is defined as a third potential difference, the control unit controls the voltage application unit to form the third potential difference to be less than the first potential difference or controls the third potential difference to have polarity reversed from polarity of the first potential difference.

13. The image forming apparatus according to claim 12, wherein a surface potential of the image bearing member is zero in the first rotation operation.

14. The image forming apparatus according to claim 12, wherein the third potential difference is zero in the first rotation operation.

15. The image forming apparatus according to claim 12, wherein, in the first rotation operation, the control unit performs control to change a surface potential of the image bearing member in a stepwise manner immediately after end of the image forming operation.

16. The image forming apparatus according to claim 15, wherein the control unit performs control to change, in a stepwise manner, the voltage to be applied to the developer bearing member by the voltage application unit, immediately after the end of the image forming operation, in the first rotation operation.

17. The image forming apparatus according to claim 12, wherein, in a case where developer remains on the surface of the image bearing member after a developer image is transferred from the image bearing member, the remaining developer is collected by the developer bearing member.

18. An image forming apparatus comprising:

an image bearing member configured to bear an electrostatic latent image on a surface of the image bearing member;

a developer bearing member configured to be in contact with the surface of the image bearing member and to bear a developer on a surface of the developer bearing member to perform an image forming operation in which the electrostatic latent image is developed into an image with the developer;

a supply member configured to be in contact with the surface of the developer bearing member and to supply the developer to the developer bearing member;

a voltage application unit configured to apply a voltage to the supply member; and a control unit configured to control the voltage application unit, wherein, in a case of performing operations, the control unit performs a first rotation operation before performing the image forming operation, wherein, in the first rotation operation, the surface of the image bearing member and the surface of the developer bearing member are in contact with each other and are rotated, and wherein, assuming that a potential difference between the developer bearing member and the supply member in the image forming operation is defined as a first potential difference, and a potential difference between the developer bearing member and the supply member in the first rotation operation is defined as a second potential difference, the control unit controls the voltage application unit to form the second potential difference to be less than the first potential difference or controls the second potential difference to have polarity reversed from polarity of the first potential difference.

19. An image forming apparatus comprising:

an image bearing member configured to bear an electrostatic latent image on a surface of the image bearing member;

a developer bearing member configured to be in contact with the surface of the image bearing member and to bear a developer on a surface of the developer bearing member to perform an image forming operation in which the electrostatic latent image is developed into an image with the developer;

a supply member configured to be in contact with the surface of the developer bearing member and to supply the developer to the developer bearing member;

a voltage application unit configured to apply a voltage to the supply member; and a control unit configured to control the voltage application unit, wherein, in a case of performing operations, the control unit performs a first rotation operation after performing the image forming operation, wherein, in the first rotation operation, the surface of the image bearing member and the surface of the developer bearing member are in contact with each other and are rotated, and wherein, assuming that a potential difference between the developer bearing member and the supply member in the image forming operation is defined as a first potential difference, and a potential difference between the developer bearing member and the supply member in the first rotation operation is defined as a third potential difference, the control unit controls the voltage application unit to form the third potential difference to be less than the first potential difference or controls the third potential difference to have polarity reversed from polarity of the first potential difference.

20. An image forming apparatus comprising:

an image bearing member configured to bear an electrostatic latent image on a surface of the image bearing member;

a developer bearing member configured to be in contact with the surface of the image bearing member and to bear a developer on a surface of the developer bearing member to perform an image forming operation in which the electrostatic latent image is developed into an image with the developer and to be applied a first voltage in the image forming operation; and a supply member configured to be in contact with the surface of the developer bearing member and to supply the developer to the developer bearing member and to be applied a second voltage in the image forming operation, wherein, in a case of performing operations, a first rotation operation is performed before the image forming operation is performed, wherein, in the first rotation operation, the surface of the image bearing member and the surface of the developer bearing member are in contact with each other and are rotated, and wherein, assuming that a potential difference between the first voltage and the second voltage in the image forming operation is defined as a first potential difference, and a potential difference between the first voltage and the second voltage in the first rotation operation is defined as a second potential difference, the first voltage and the second voltage are changed so that the second potential difference is less than the first potential difference or are changed so that the second potential difference is a polarity reversed from polarity of the first potential difference.

21. An image forming apparatus comprising:

an image bearing member configured to bear an electrostatic latent image on a surface of the image bearing member;

a developer bearing member configured to be in contact with the surface of the image bearing member and to bear a developer on a surface of the developer bearing member to perform an image forming operation in which the electrostatic latent image is developed into an image with the developer and to be applied a first voltage in the image forming operation; and a supply member configured to be in contact with the surface of the developer bearing member and to supply the developer to the developer bearing member and to be applied a second voltage in the image forming operation, wherein, in a case of performing operations, a first rotation operation is performed after the image forming operation is performed, wherein, in the first rotation operation, the surface of the image bearing member and the surface of the developer bearing member are in contact with each other and are rotated, and wherein, assuming that a potential difference between the first voltage and the second voltage in the image forming operation is defined as a first potential difference, and a potential difference between the first voltage and the second voltage in the first rotation operation is defined as a third potential difference, the first voltage and the second voltage are changed so that the third potential difference is less than the first potential difference or are changed so that the third potential difference is a polarity reversed from polarity of the first potential difference.

* * * * *